United States Patent
Schreiber

(10) Patent No.: US 9,158,101 B2
(45) Date of Patent: Oct. 13, 2015

(54) DEVICE AND METHOD FOR DISTRIBUTING ILLUMINATION LIGHT AND DETECTED LIGHT IN A MICROSCOPE

(75) Inventor: Frank Schreiber, Dossenheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 311 days.

(21) Appl. No.: 13/570,358

(22) Filed: Aug. 9, 2012

(65) Prior Publication Data
US 2013/0038875 A1 Feb. 14, 2013

(30) Foreign Application Priority Data
Aug. 12, 2011 (DE) .......................... 10 2011 052 686

(51) Int. Cl.
| | |
|---|---|
| *G01J 4/00* | (2006.01) |
| *G01N 21/25* | (2006.01) |
| *G01N 21/86* | (2006.01) |
| *G02F 1/01* | (2006.01) |
| *G02B 21/00* | (2006.01) |
| *G02B 21/16* | (2006.01) |
| *G02B 27/28* | (2006.01) |

(52) U.S. Cl.
CPC ........ *G02B 21/0032* (2013.01); *G02B 21/0068* (2013.01); *G02B 21/0076* (2013.01); *G02B 21/16* (2013.01); *G02B 27/283* (2013.01)

(58) Field of Classification Search
CPC .............. G01N 21/6458; G01N 21/21; G01N 21/6408; G01N 21/6428; G01N 21/64; G02B 21/0076; G02B 21/0032; G02B 2207/113
USPC .............. 356/364, 369, 417; 250/559.09, 225
See application file for complete search history.

(56) References Cited

U.S. PATENT DOCUMENTS
| | | | |
|---|---|---|---|
| 5,202,744 A | 4/1993 | Louis | |
| 5,736,410 A * | 4/1998 | Zarling et al. ................ | 436/172 |

(Continued)

FOREIGN PATENT DOCUMENTS
| | | |
|---|---|---|
| DE | 10031458 A1 | 1/2002 |
| DE | 10102218 A1 | 8/2002 |

(Continued)

OTHER PUBLICATIONS

European Patent Office, Extended European Search Report in European Patent Application No. 12 18 0040.0 (Nov. 15, 2012).

*Primary Examiner* — Tarifur Chowdhury
*Assistant Examiner* — Sunghee Y Gray
(74) *Attorney, Agent, or Firm* — Leydig, Voit & Mayer, Ltd.

(57) ABSTRACT

A device for distributing illumination light and detected light in a microscope includes a distributor optic configured to guide illumination light onto a sample and guide detected light proceeding from the sample onto a detector. The distributor optic includes a polarization unit disposed in a first light path and configured to convert the illumination light directed onto the sample into a first polarization state, a beam splitter disposed in the first light path and having the polarization dependence so as to guide the converted illumination light onto the sample, a first portion of the detected light back into the first light path, and a second portion of the detected light into a second light path separated from the first light path. A beam combiner is configured to combine the first portion and the second portion of the detected light and guide the first portion and second portion onto the detector.

16 Claims, 2 Drawing Sheets

(56) References Cited

U.S. PATENT DOCUMENTS

| | | |
|---|---|---|
| 6,492,638 B2 | 12/2002 | Hoffmann |
| 7,872,799 B2 | 1/2011 | Wolleschensky |
| 2004/0099813 A1 | 5/2004 | Eggeling et al. |
| 2005/0231717 A1 | 10/2005 | Hsu et al. |
| 2006/0017001 A1 | 1/2006 | Donders et al. |
| 2008/0042050 A1* | 2/2008 | Tanaka et al. ............. 250/225 |
| 2009/0213376 A1 | 8/2009 | Takatsuka |
| 2012/0038907 A1 | 2/2012 | Schreiber |

FOREIGN PATENT DOCUMENTS

| | | |
|---|---|---|
| DE | 102005020545 A1 | 11/2006 |
| DE | 102010047237 A1 | 2/2012 |
| EP | 0015129 A1 | 9/1980 |
| JP | 2005345561 A | 12/2005 |
| WO | WO 02/50516 A2 | 6/2002 |

* cited by examiner

DEVICE AND METHOD FOR DISTRIBUTING ILLUMINATION LIGHT AND DETECTED LIGHT IN A MICROSCOPE

CROSS REFERENCE TO RELATED APPLICATIONS

This application claims priority to German Patent Application No. DE 10 2011 052 686.2, filed Aug. 12, 2011, which is hereby incorporated by reference herein in its entirety.

FIELD

The invention relates to a device for distributing illumination light and detected light in a microscope, having a distributor optic that guides the illumination light onto a sample and guides the detected light proceeding from the sample onto a detector. The invention further relates to a method distributing illumination light and detected light in a microscope.

BACKGROUND

Optical beam splitters, whose function is to guide the illumination light emitted from a light source onto the sample to be imaged, and to guide the detected light proceeding from the sample onto a detector, are often used in microscopy. The illumination light serves, for example in fluorescence microscopy, to excite fluorescent radiation. In this function it is hereinafter also referred to as "excitation light."

An optical beam splitter is as a rule embodied so that it transmits light of a predetermined wavelength region and reflects light of another wavelength region. It should therefore be designed especially for the combinations of wavelengths of the excitation light and the fluorescent light that are used in the respective microscope. This is disadvantageous in terms of the broadest possible applicability of such a beam splitter.

Acoustooptical beam splitters, on the other hand, which are used for example in confocal microscopy, are adjustable within comparatively broad limits to the wavelengths to be reflected and transmitted by them. For example, acoustooptical beam splitters of this kind can be used in conjunction with so-called white light laser sources in order to select individual excitation wavelengths, as desired, from a broad wavelength spectrum. Adjusting an acoustooptical beam splitter to specific wavelengths requires a certain technical outlay, however, for example in the form of corresponding programming of the beam splitter by the application of electric fields of different frequencies. This is particularly disadvantageous when the adjustment of the beam splitter needs to be modified frequently, as is the case, for example, when using solid-state laser light sources whose output wavelengths exhibit comparatively severe temperature drift. It is also especially disadvantageous if the wavelength or wavelength spectrum of the laser light source is unknown and/or variable. Acoustooptical beam splitters are moreover comparatively expensive.

SUMMARY

In an embodiment, the present invention provides a device for distributing illumination light and detected light in a microscope including a distributor optic configured to guide illumination light onto a sample and guide detected light proceeding from the sample onto at least one detector. The distributor optic includes a polarization unit disposed in a first light path and configured to convert the illumination light directed onto the sample into a first polarization state, a beam splitter disposed in the first light path and having a polarization dependence so as to guide the illumination light converted into the first polarization state onto the sample, a first portion of the detected light proceeding from the sample and exhibiting the first polarization state back into the first light path, and a second portion of the detected light proceeding from the sample and exhibiting a second polarization state into a second light path separated from the first light path. The second polarization state is different from the first polarization state. A beam combiner is configured to combine the first portion and the second portion of the detected light and guide the first portion and second portion onto the detector.

BRIEF DESCRIPTION OF THE DRAWINGS

Exemplary embodiments of the present invention are described in more detail below with reference to the drawings, in which.

DETAILED DESCRIPTION

Figure 1:
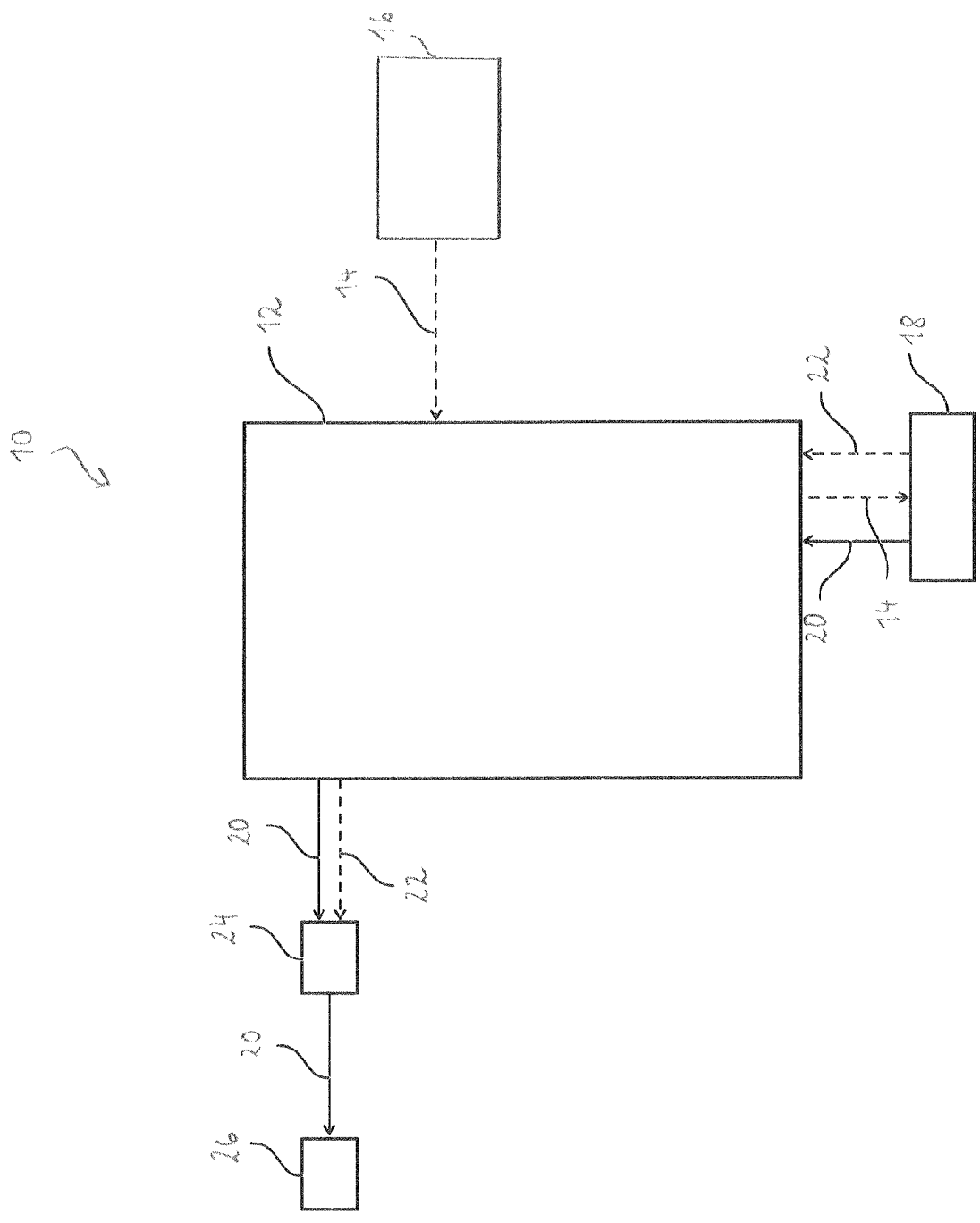
FIG. 1 is a block diagram showing an embodiment of a light distributor device according to the present invention.

In an embodiment, the present invention provides a device that enables a simple and flexible distribution of illumination light and detected light in a microscope.

In an embodiment, the present invention provides a device with a distributor optic that guides the illumination light onto a sample and guides the detected light proceeding from the sample onto a detector, and encompasses a polarization unit, arranged in a first light path, for converting the illumination light directed onto the sample into a first polarization state; a beam splitter, arranged in the first light path, which has a polarization dependence such that it guides the illumination light converted into the first polarization state onto the sample, and guides a first portion of the detected light proceeding from the sample, which portion exhibits the first polarization state, back into the first light path, while it guides a second portion of the detected light, which portion exhibits a second polarization state different from the first polarization state, into a second light path separated from the first light path; and a beam combiner that combines the first portion and the second portion of the detected light with one another and guides them onto the detector.

In contrast to the solutions known from the existing art, embodiments of the device according to the present invention provides for largely wavelength-independent distribution of the illumination light and detected light in the microscope. The light is thus distributed not as a function of its wavelength, but instead as a function of its polarization state. In particular, differently polarized components of the detected light are guided on different light paths to the detector.

The illumination light in this context is, for example, excitation light, emitted from a laser light source, that stimulates the sample being imaged to emit fluorescent light. The detected light then contains on the one hand the fluorescent light, as well as the excitation light reflected at the sample and, if applicable, further light components such as phosphorescing light, Raman scattered light, etc.

That portion of the detected light that, like the illumination light directed onto the sample, exhibits a first polarization state, is guided back through the polarization-dependent light distributor into the first light path in which the illumination light is directed onto the sample. On the other hand, that portion of the detected light that exhibits the second polarization state is guided via the second light path onto the detector. The polarization state thus determines the light path on which the detected light is delivered to the detector. The aforementioned polarization states are preferably linearly polarized states, which enable a polarization-dependent distribution of the detected light by means of the light distributor.

The light distributor used is preferably a polarizing beam splitter, for example in the form of a polarizing cube, which reflects and transmits the incident detected light as a function of polarization. The beam splitter can be embodied, for example, in such a way that it transmits back into the first light path that portion of the detected light that, like the illumination light directed onto the sample, is in the first polarization state, while it reflects into the second light path that portion of the detected light that exhibits the second polarization state. Consideration should be given here to the fact that the detected light proceeding from the sample—which, for example in fluorescence microscopy, contains as essential components the excitation light reflected at the sample as well as the fluorescent light triggered by the excitation light—is substantially unpolarized. This unpolarized detected light is broken down by the beam splitter into two differently polarized components that are then guided via the two separate light paths to the beam combiner, which lastly combines the two polarized light components back into unpolarized detected light.

The light distribution device according to embodiments of the present invention has the advantage, as compared with conventional optical beam splitters that are designed only for specific wavelength combinations of the excitation light and detected light, of guiding the excitation light and detected light respectively onto the sample or the detector in the desired manner for any desired wavelength. A special design for specific wavelength combinations is not necessary.

Advantages are also obtained as compared with acoustooptical beam splitters of the existing art. With the device according to an embodiment of the present invention, for example, it is not necessary to perform the programming operations provided in the context of acoustooptical beam splitters in order to set different excitation wavelengths. The technical outlay and the costs associated with such programming are correspondingly also eliminated.

In an embodiment, the invention makes it possible to distribute light of any wavelength in the manner desired, for example by corresponding reflection and transmission actions. It can be used, without manual adaptation, for any desired individual wavelengths and for wavelength regions of any desired width. For example, the same wavelength region that is opened for an excitation path can be opened simultaneously for the detection path. The result is that no loss of detected light occurs if its wavelength region overlaps with the wavelength region of the excitation light or is in fact entirely contained within it.

The device according to an embodiment of the present invention is, in particular, insensitive to wavelength fluctuations such as those that occur, for example, in solid-state laser light sources as a function of temperature. Because of its wavelength independence, the device is also particularly advantageously usable in combination with a white light laser source in order to achieve fluorescence excitation over a broad wavelength region, for example a region from 400 nm to 800 nm.

When embodiments of the invention are applied in fluorescence microscopy, the detected light guided to the detector on the two light paths then contains, as already mentioned above, not only the fluorescent light triggered by the excitation light but also the excitation light reflected at the sample, as well as possibly further light components. Usually, only the fluorescent light is intended to be evaluated in the detector as useful light. In that case the remaining light components, in particular the reflected excitation light, are to be removed (as extraneous light) from the detected light before the latter is guided onto the detector. For this, the beam combiner preferably has arranged after it a filter unit that separates useful light from extraneous light in the detected light so that only the useful light is delivered to the detector.

It must be noted, however, that it is not desirable in every application to filter the reflected excitation light out of the detected light before the latter is guided onto the detector. For example, there are also conceivable applications in which, in addition to the fluorescent light, the reflected excitation light or other light components (for example, Raman scattered light) are intended to be evaluated. Because the invention provides for guiding the detected light in wavelength-independent fashion via two separate light paths onto the beam combiner, it is possible to define arbitrarily, by way of the filter unit arranged after the beam combiner, which light components of the detected light are ultimately delivered to the detector.

The filter unit preferably encompasses a notch filter or a narrow-band blocking filter for filtering out extraneous light, e.g. the excitation light that triggers fluorescent light. Very narrow wavelength regions can be reliably filtered out of the detected light by means of such a filter.

In another embodiment, the filter unit encompasses a so-called time gating unit that operates, for example, in accordance with the method described in DE 10 2010 047 237, which is incorporated by reference herein in its entirety. In this method, the fluorescent light emitted from a, for example, fluorescing sample, and the light reflected from that sample, are separated from one another by means of an electronic system downstream from the detector. The method is based on the fact that the two light components arrive at the detector not simultaneously, but instead sequentially. A time gating unit is preferred in particular when a pulsed laser light source is used.

Other possibilities for filtering extraneous light out of the detected light are, however, also conceivable. For example, when a modulated light source is used, a corresponding signal separation can be performed by demodulation.

In a further preferred embodiment, the polarization unit comprises an Faraday rotator that rotates the polarization direction of the illumination light by a first angular amount in a predetermined rotation direction, and rotates the polarization direction of the portion of the detected light guided back into the first light path by the same first angular amount in the same rotation direction. In this embodiment both the illumination light and the detected light, which are transferred in the first light path, are therefore present in a linearly polarized state that is modified by the Faraday rotator in the same rotation direction in each case. In order to ensure the desired polarization state of the detected light guided back into the first light path, the beam splitter arranged in the first light path is preferably embodied in linearly polarizing fashion. This means that the beam splitter reflects back or transmits into the first light path only that portion of the detected light proceeding from the sample which exhibits the desired polarization direction.

A Faraday rotator of this kind is produced from a material that, in the presence of a magnetic flux, makes possible a defined modification of the polarization direction of the light passing through the material. For example, if the Faraday rotator produces a 45-degree rotation of the polarization direction, the polarization direction of light that passes through the Faraday rotator twice in opposite directions is then rotated a total of 90°. This codirectional rotation of the polarization direction can be utilized, according to the present invention, to adjust the polarization states of the illumination light and of the detected light so that the desired spatial distribution of the illumination light and of the detected light is achieved, i.e. the illumination light and the detected light are guided in the desired manner respectively onto the sample and onto the detector.

In an embodiment, the polarization unit comprises a delay plate that rotates the polarization direction of the illumination light that has passed through the Faraday rotator by a second angular amount in the predetermined rotation direction, and that rotates the polarization direction of the linearly polarized portion, guided back in the first light path, of the detected light, prior to passage through the Faraday rotator, by the same second angular amount in the opposite rotation direction. The aforesaid second angular amount is preferably equal to 45°.

Use of the Faraday rotator, e.g. the Faraday rotator, in combination with a delay plate ensures minimization of the polarization dispersion in the detection path of the device, which dispersion is defined by the two separate light paths on which the two differently polarized components of the detected light are transferred. "Polarization dispersion" is to be understood here as the wavelength dependence exhibited by the rotation, produced by the respective polarizing material, of the polarization direction. A non-negligible polarization dispersion thus means that the polarizing material rotates the polarization direction of the light not by the desired identical angular amount for all wavelengths, but by different angular amounts. Polarizing materials are therefore usually designed so that they rotate the polarization direction of the light through the desired rotation angle only for a specific working wavelength, while certain deviations from the desired rotation angle occur for other wavelengths.

In the embodiment described above, this circumstance is utilized in order to render the polarization dispersion negligible for the detected light guided onto the detector. The Faraday rotator and the delay plate can thus be embodied so that their polarization dispersions in terms of the first portion, guided in the first light path, of the detected light cancel each other out. The result is that the wavelength independence of the polarization of the detected light effected by the device is further improved.

A consequence of compensating for polarization dispersions in terms of the detected light is that the rotation dispersions in the illumination path are intensified. This results in a certain (wavelength-dependent) loss of illumination light, which is nevertheless insignificant in practical implementation since laser light sources used nowadays have sufficiently high output to make available the necessary quantity of illumination light.

In a preferred embodiment, the polarization unit comprises a polarizing light entry element that guides the illumination light emitted from a light source onto the Faraday rotator. The light entry element ensures, for example, that the illumination light emitted from the light source is incident in a linearly polarized state onto the Faraday rotator.

The light entry element preferably guides onto the beam combiner that portion of the detected light which has passed through the Faraday rotator. In this embodiment the light entry element acts not only on the illumination light but also on the detected light guided back into the first light path, in order to deliver the latter light to the light combiner and then to the detector.

The beam splitter and/or the beam combiner and/or the light entry element are each embodied, for example, as a polarizing cube. With the aid of a polarizing cube of this kind, polarizing reflections and transmissions for purposes of the desired light distribution can be achieved particularly easily.

In a preferred embodiment, a white light laser source and/or a pulsed laser light source and/or a modulated laser light source are provided for emitting the illumination light. Because the device according to the present invention controls the spatial distribution of the illumination light and of the detected light not via the wavelengths of the light, as is usual in the existing art, but instead by way of the polarization state of the light, the laser light sources recited above, which each emit light having a more or less broad wavelength spectrum, can be used profitably for a very wide variety of applications. With the use of a white light laser source, for example, it is possible to utilize the entire visible wavelength spectrum as excitation light, and at the same time to evaluate fluorescent light whose wavelength lies within that wavelength spectrum.

According to a further aspect of the invention, a microscope, in particular a confocal fluorescence microscope, is provided, which encompasses a device of the kind described above for distributing illumination light and detected light.

The invention further provides a method for distributing illumination light and detected light in a microscope.

FIG. 1 shows an exemplifying embodiment of a light distributor device 10 according to the present invention, which is part of a confocal fluorescence microscope. Only the basic manner of operation of light distributor device 10 is illustrated in the block diagram of FIG. 1.

Light distributor device 10 encompasses a distributor optic 12 that will be explained later on in detail with reference to FIG. 2. Distributor optic 12 receives linearly polarized excitation light 14 that is emitted from a laser light source 16. Laser light source 16 is, for example, a white light source that outputs excitation light 14 in a wavelength region from approximately 400 to 800 nm.

The wavelength region indicated is of course to be understood as merely an example. It can also be broader or narrower than indicated, or can encompass a different wavelength band.

Excitation light 14 is directed by distributor optic 12 onto a fluorescing sample 18. Distributor optic 12 receives all the light that proceeds from sample 18 impinged upon by excitation light 14. This light is on the one hand the fluorescent light that is triggered by excitation light 14 and labeled 20 in FIG. 1, and on the other hand the excitation light that is reflected at sample 18 and labeled 22 in FIG. 1. Fluorescent light 20 and the reflected excitation light 22 are hereinafter referred to in their entirety as "detected light." Be it noted in this context that in the fluorescence application depicted in FIG. 1, the detected light can also comprise further light components alongside fluorescent light 20 and the reflected excitation light 22, for example phosphorescing light and/or Raman scattered light. To simplify the explanation, however, this is ignored hereinafter.

The detected light that proceeds from sample 18, made up of fluorescent light 20 and the reflected excitation light 18, is largely unpolarized. Within distributor optic 12 it is firstly separated into differently linearly polarized light components which are then combined again into unpolarized light. The result is thus that distributor optic 12 guides the unpolarized fluorescent light 20 and the unpolarized reflected excitation light 22 onto a filter unit 24. Filter unit 24 is, for example, a time gating unit or a notch filter, which filters the reflected excitation light 22 out of the detected light. It is assumed hereinafter that in the fluorescence application illustrated in FIG. 1, the reflected excitation light 22 is regarded as extraneous light. As already discussed earlier, however, this is not necessarily the case. For example, applications in which the reflected excitation light 22 is to be evaluated alongside fluorescent light 20 are also conceivable. In the latter case, filter unit 24 can be omitted.

Filter unit 24 outputs the detected light, from which the reflected excitation light 22 has been filtered out and which is thus now made up only of fluorescent light 20, to a detector 26. Lastly, detector 26 converts the received fluorescent light 20 into signals that can be evaluated.

Figure 2:
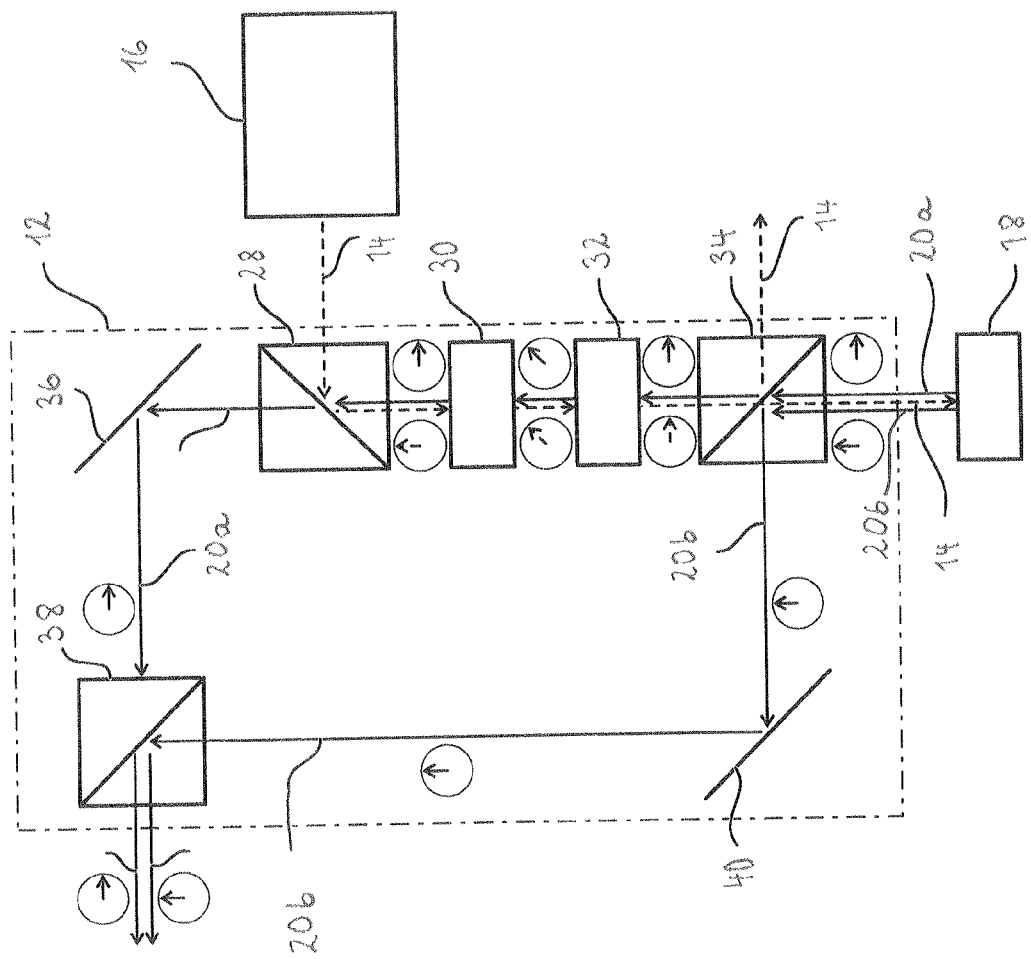
FIG. 2 shows a distributor optic provided in the light distributor device according to FIG. 1.

FIG. 2 illustrates in detail the manner of operation of distributor optic 12. Be it noted in this context that in order to simplify the depiction, the extraneous light, i.e. excitation light 22 reflected at sample 18, is not depicted in FIG. 1. It is, however, processed in distribution optic 12 in the same manner as for fluorescent light 20.

Distributor optic 12 contains a first polarizing beam splitter cube 28 as a light entry element that receives the linearly polarized excitation light 14 outputted from laser light source 16.

First beam splitter cube 28 reflects the excitation light 14, linearly polarized perpendicularly to the plane of incidence, with a high reflectance, e.g. 99.99%. The polarization direction of excitation light 14 outputted from laser light source 16 is preferably correspondingly oriented for this purpose a priori. In FIG. 2, the polarization directions of excitation light 14 and of fluorescent light 20 that are established by distributor optic 12 in the individual distributor stages are indicated by the circle/arrow symbols.

Beam splitter cube 28 reflects excitation light 14 onto a Faraday rotator 30 that rotates the polarization direction of excitation light 14 through 45 degrees in a first rotation direction. Excitation light 14 is then incident onto a λ/2 delay plate 32 that provides a further rotation of the polarization direction of excitation light 14 through 45° in the same rotation direction. The result of Faraday rotator 30 and delay plate 32 is thus that the polarization direction of excitation light 14 is rotated a total of 90° in the first rotation direction.

Distributor optic 12 contains a second polarizing beam splitter cube 34 onto which excitation light 14 that has passed through delay plate 32 is incident. Excitation light 14 outputted from delay plate 32 is polarized in parallel with respect to second beam splitter cube 34. Beam splitter cube 34 thus transmits excitation light 14 at a high transmittance, e.g. approximately 98%, onto sample 18.

The linearly polarized excitation light 14 incident onto sample 18 triggers, in sample 18, fluorescent light 20 that in turn enters distributor optic 12. As mentioned earlier, fluorescent light 20 is largely unpolarized. It thus contains two fluorescent light components polarized perpendicularly to one another, which are labeled 20a and 20b in FIG. 2. First fluorescent light component 20a is intended to be oriented parallel to the light incidence plane, and second fluorescent light component 20b perpendicular to said plane.

First fluorescent light component 20a passes through polarizing beam splitter cube 34 and then through delay plate 32, which rotates fluorescent light component 20a through 45° in a second rotation direction that is opposite to the first rotation direction in which delay plate 34 rotates the polarization direction of excitation light 14 that is propagating in the opposite direction and is directed onto sample 18. The rotation direction in which delay plate 32 rotates the polarization direction thus changes with the transit direction in which the light passes through delay plate 32.

First fluorescent light component 20a is then incident onto Faraday rotator 30, which rotates the polarization direction of first fluorescent light component 20a through 45° in the first rotation direction. The rotation direction of Faraday rotator 30 is thus independent of the light passage direction. This means that Faraday rotator 30 cancels out the change in the polarization direction of first fluorescent light component 20a that is produced by delay plate 32. The result is that the polarization direction of first fluorescent light component 20a does not change upon passage through the unit constituted by delay plate 32 and Faraday rotator 30.

After passing through Faraday rotator 30, first fluorescent light component 20a exhibits a polarization direction that is perpendicular to the polarization direction of excitation light 14 reflected at first beam splitter cube 28. Whereas the latter is reflected at beam splitter cube 28, second fluorescent light component 20a therefore goes through beam splitter cube 28 and is then incident onto a mirror 36. Mirror 36 reflects the linearly polarized first fluorescent light component 20a onto a third polarizing beam splitter cube 38. Beam splitter cube 38 is embodied so that it transmits first fluorescent light component 20a toward filter unit 24 (not shown in FIG. 2).

Second fluorescent light component 20b proceeding from sample 18, the polarization direction of which is perpendicular to the polarization direction of first fluorescent light component 20a, is reflected at polarizing beam splitter cube 34 onto a mirror 40 that in turn reflects second fluorescent light component 20b onto beam splitter cube 38. The polarization direction of second fluorescent light component 20b is oriented so that it is reflected at beam splitter cube 38 toward filter unit 24.

Distributor optic 12 thus transfers first fluorescent light component 20a in a first light path that is defined by components 34, 32, 30, 28, and 36, and second fluorescent light component 20b in a second light path that is defined by components 34 and 40. The fluorescent light components 20a and 20b transferred in these two separate light paths are then combined again by beam splitter cube 38.

In the exemplifying embodiment shown in FIG. 2, Faraday rotator 30 and delay plate 32 interact in such a way that their polarization dispersions, in terms of first fluorescent light component 20a that is guided in the aforementioned first light path onto beam splitter cube 38, cancel one another out. This ensures that the polarization states shown in FIG. 2, which distributor optic 12 establishes for spatial distribution of the two fluorescent light components 20a and 20b (and of the reflected excitation light not shown in FIG. 2), can be implemented for all wavelengths of the fluorescent light (and of the reflected excitation light). In other words, the polarization dispersions of Faraday rotator 30 and of delay plate 32 are selected so that they exactly cancel one another out in the detection path leading to detector 26.

A consequence of this, conversely, is that the aforesaid polarization dispersions on the excitation path directed onto sample 18 reinforce one another. The result of this in turn is that a portion of excitation light 14 emitted from laser light source 16 does not, as a function of wavelength, pass through the second beam splitter cube but instead is reflected at it. This reflected light component represents a wavelength-dependent light loss that is, however, tolerable in view of the fact that laser light source 16 can in any event make sufficient light output available. The result is therefore that in the interest of a maximally broad-band detection path, the incoupling efficiency of excitation light 14 into the excitation path is thus reduced.

The embodiment depicted in FIG. 2 is to be understood as merely an example. A number of variants are conceivable, in particular in terms of the polarization states of excitation light 14 and of fluorescent light 20 that are implemented by distributor optic 12. If the wavelengths of fluorescent light 20 that is to be detected are located in a very narrow wavelength region, for example, the compensation for rotational dispersion, as explained above, can then also be dispensed with, since the detection path does not in any case need to be implemented in broad-band fashion. In that case delay plate 32 could accordingly be omitted.

While the invention has been particularly shown and described with reference to preferred embodiments thereof, it will be understood by those skilled in the art that various changes in form and details may be made therein without departing from the spirit and scope of the invention.

PARTS LIST

10 Light distributor device
12 Distributor optic
14 Excitation light
16 Laser light source
18 Sample
20 Fluorescent light
20a First fluorescent light component
20b Second fluorescent light component
22 Reflected excitation light
24 Filter unit
26 Detector
28 First beam splitter cube
30 Faraday rotator
32 Delay plate
34 Second beam splitter cube
36 Mirror
38 Third beam splitter cube
40 Mirror

What is claimed is:

1. A device for distributing illumination light and detected light in a microscope, the device comprising:
    a distributor optic configured to guide illumination light onto a sample and guide detected light proceeding from the sample onto at least one defector, the distributor optic comprising:
        a polarization unit, disposed in a first light path, and configured to convert the illumination light directed onto the sample into a first polarization state;
        a beam splitter disposed in the first light path, the beam splitter having a polarization dependence so as to guide the illumination light converted into the first polarization state onto the sample, to guide a first portion of the detected light proceeding from the sample and exhibiting the first polarization state back into the first light path, and to guide a second portion of the detected light proceeding from the sample and exhibiting a second polarization state into second light path separated from the first light path, the second polarization state being different from the first polarization state; and
        a beam combiner configured to combine the first portion and the second portion of the detected light and guide the first portion and second portion onto the detector;
    wherein at least one of the beam splitter or the beam combiner includes a polarizing beam splitter cube.

2. The device recited in claim 1, further comprising a filter unit disposed after the beam combiner and configured to separate useful light from extraneous light in the detected light.

3. The device recited in claim 2, wherein the filter unit includes a notch filter configured to filter out the extraneous light.

4. The device recited in claim 1, wherein the filter unit includes a time gating unit.

5. The device recited in claim 1, wherein the polarization unit includes an Faraday rotator configured to rotate a polarization direction of the illuminating light by a first angular amount in a predetermined rotation direction and to rotate a polarization direction of the first portion of the detected light guided back into the first light path by the same first angular amount in the same rotation direction.

6. The device recited in claim 5, wherein the first angular amount is 45°.

7. The device recited in claim 5, wherein the polarization unit includes a delay plate configured to rotate the polarization direction of the illumination light that has passed through the Faraday rotator by a second angular amount in the predetermined rotation direction, and to rotate the polarization direction of the linearly polarized first portion of the detected light, prior to passage through the Faraday rotator, by the same second angular amount in an opposite rotation direction.

8. The device recited in claim 7, wherein the second angular amount is 45°.

9. The device recited in claim 7, wherein the Faraday rotator and the delay plate are configured so that the polarization dispersion of the Faraday rotator, with respect to the first portion, guided in the first light path, of the detected light cancels out the polarization dispersion of the delay plate.

10. The device recited in claim 5, wherein the polarization unit includes a polarizing light entry element configured to guide the illumination light emitted from a light source onto the Faraday rotator.

11. The device recited in claim 10, wherein the light entry element is configured to guide a portion of the detected light having passed through the Faraday rotator onto the beam combiner.

12. The device recited in claim 10, wherein at least one of the beam splitter, the beam combiner, or the light entry element includes a polarizing beam splitter cube.

13. The device recited in claim 1, wherein the illumination light is emitted by at least one of a white light laser source, a pulsed laser light source or a modulated laser light source.

14. A microscope comprising:
    a device for distributing illumination light and detected light including a distributor optic configured to guide illumination light onto a sample and guide detected light proceeding from the sample onto at least one detector, the distributor optic comprising:
        a polarization unit, disposed in a first light path, and configured to convert the illumination light directed onto the sample into a first polarization state;
        a beam splitter disposed in the first light path, the beam splitter having a polarization dependence so as to guide the illumination light converted into the first polarization state onto the sample, to guide a first portion of the detected light proceeding from the sample and exhibiting the first polarization state back into the first light path, and to guide a second portion of the detected light proceeding from the sample and exhibiting a second polarization state into a second light path separated from the first light path, the second polarization state being different from the first polarization state; and a beam combiner configured to combine the first portion and the second portion of the detected light and guide the first portion and second portion onto the detector, wherein at least one of the beam splitter or the beam combiner includes a polarizing beam splitter cube.

15. The microscope recited in claim 14, wherein the microscope is a confocal fluorescence microscope.

16. A method for distributing illumination light and detected light in a microscope, the method comprising:

converting illumination light in a first light path into a first polarization state;

guiding, by a beam splitter, the illumination light converted into the first polarization state onto the sample;

guiding, by the beam splitter, a first portion of the detected light proceeding from the sample that exhibits the first polarization state into the first light path;

guiding, by the beam splitter, a second portion of the detected light proceeding from the sample that exhibits a second polarization state different from the first polarization state into a second light path separated from the first light path; and combining, by a beam combiner, the first portion and second portion of the detected light; and directing, by the beam combiner, the first portion and second portion of detected light onto the detector, wherein at least one of the beam splitter or the beam combiner includes a polarizing beam splitter cube.

* * * * *